(12) United States Patent
Yang et al.

(10) Patent No.: US 9,407,484 B2
(45) Date of Patent: Aug. 2, 2016

(54) SYNCHRONIZATION SEQUENCE WITH TONE NOTCHING IN OFDM SYSTEMS

(75) Inventors: Jun Yang, Croton-On-Hudson, NY (US); Dagnachew Birru, Yorktown Heights, NY (US); Dong Wang, Ossining, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1149 days.

(21) Appl. No.: 12/281,821

(22) PCT Filed: Mar. 6, 2007

(86) PCT No.: PCT/IB2007/050741
§ 371 (c)(1),
(2), (4) Date: Sep. 5, 2008

(87) PCT Pub. No.: WO2007/102123
PCT Pub. Date: Sep. 13, 2007

(65) Prior Publication Data
US 2009/0052567 A1 Feb. 26, 2009

Related U.S. Application Data

(60) Provisional application No. 60/779,745, filed on Mar. 7, 2006, provisional application No. 60/816,231, filed on Jun. 23, 2006.

(51) Int. Cl.
*H04K 1/10* (2006.01)
*H04L 27/28* (2006.01)
*H04L 27/26* (2006.01)
*H04L 27/00* (2006.01)

(52) U.S. Cl.
CPC ......... *H04L 27/2613* (2013.01); *H04L 27/0006* (2013.01)

(58) Field of Classification Search
USPC .................................. 375/260, 262
See application file for complete search history.

(56) References Cited

U.S. PATENT DOCUMENTS

2005/0232336 A1   10/2005  Balakrishnan
2006/0171445 A1*  8/2006   Batra ............... H04B 1/719
                                                  375/130
2006/0233270 A1*  10/2006  Ahn ................ H04B 7/0851
                                                  375/260

FOREIGN PATENT DOCUMENTS

JP    2003304215 A    10/2003
WO    WO2006000602 A1  1/2006
WO    WO2007063514 A2  6/2007

OTHER PUBLICATIONS

J. Chiang et al., "Use of Cognitive Radio Techniques fro OFDM Ultrawideband Coexistence with WIMAX", Texas Wireless Symposium, Oct. 2005, pp. 91-95, XP002435086.
(Continued)

*Primary Examiner* — Qutbuddin Ghulamali
(74) *Attorney, Agent, or Firm* — Larry Liberchuk

(57) ABSTRACT

The present invention is a system, apparatus, and method for current MB-OFDM systems to design a time-domain sync sequence regarding DAA that (1) minimizes change to the current sync sequence, and (2) maintains the robustness of synchronization. Two tone-notching embodiments are provided for sync sequence design in the preamble when OFDM systems require detect-and-avoid (DAA) ability. The receiver needn't be aware of the change of sync sequence at the transmitter and can still use the original sync sequence. The design can be used in both DAA and non-DAA transmission modes.

12 Claims, 6 Drawing Sheets

(56) References Cited

OTHER PUBLICATIONS

Anuj Batra et al., "Multi-Band OFDM Physical layer Proposal for IEEE 802.15 Task Group 3a", Project: IEEE P802.15 Working Group for Wireless Personal Area Networks (WPANs), Sep. 2003, pp. 1-69, XP002306910.

Batra et al., "Multi-Band OFDM: A Cognitive radio foe UWB", Circuits and Systems, 2006, ISCAS 2006, Proceedings, 2006 IEEE Int'l Symposium on Kos, Greece, May 2006, Piscataway, NJ, USA, IEEE, May 2006, pp. 4094-4097, XP002442357.

\* cited by examiner

SYNCHRONIZATION SEQUENCE WITH TONE NOTCHING IN OFDM SYSTEMS

The present invention relates to a system, apparatus and method for designing a synchronization sequence when a subset of sub-carriers is turned off.

Detect and avoid (DAA) technology allows ultra-wideband (UWB) systems to coexist peacefully with current and future wireless technologies sharing the same spectrum. DAA techniques mitigate interference by searching for broadband wireless signals and automatically switching UWB devices to another frequency to prevent any conflict.

In current UWB multi-band orthogonal frequency division multiplexing (MB-OFDM) systems, each device needs to have the capability to detect existing primary narrow-band devices and the bandwidth of these systems and avoid transmission in that frequency region. These so-called detect-and-avoid (DAA) capabilities have been designed as a format of tone notching to operate during the payload transmission as well as channel estimation preamble transmission. However, design of the synchronization sequence with DAA ability without too much change made to the current sync sequence is needed to add switching flexibility between different modes as well as taking care of receivers.

Thus, there is a need in the art for a mechanism that efficiently addresses this problem while at the same time having minimal impact on existing sync sequences. The synchronization sequence of UWB MB-OFDM systems should not only have good correlation property but also satisfy the emission mask requirement issued by FCC. If some tones in the frequency domain for the sync sequence are required to be zero (notched to zero in the spectrum of the sync sequence), the present invention avoids a redesign of the sync sequence in the frequency domain. Usually the receiver doesn't know whether certain tones have been notched or not at the transmitter, and the present invention maintains the good correlation properties of an existing sync sequence.

When the OFDM system requires a sync sequence taking into consideration DAA, the sync sequence designer can notch the corresponding sub-carriers to zero in the spectrum of a current sync sequence. In a preferred first embodiment, the new sync sequence is the inverse-FFT version of the notched spectrum according to a first formula of the present invention. When symmetric notching is needed, in a second preferred embodiment of the present invention, a second formula is provided to generate a real sync sequence. The receiver needn't be aware of the notching at the transmitter.

Figure 1:
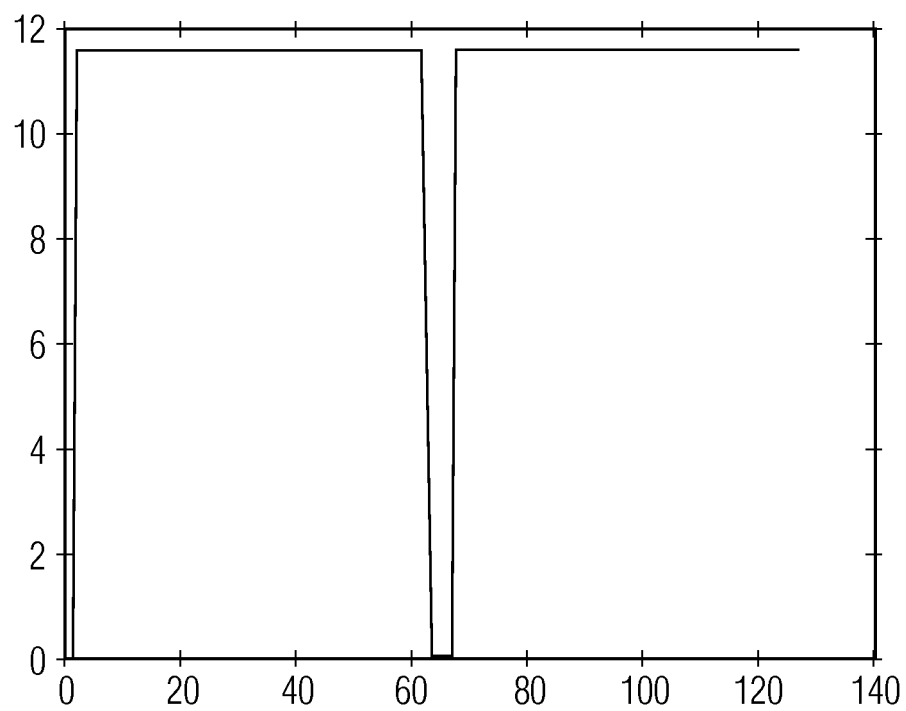
FIG. 1 illustrates the spectrum of an original sync sequence.

The present invention can be readily understood by one skilled in the art in view of the following detailed description with reference to the accompanying drawings presented only for illustrative purposes. In the drawings, the same reference symbols denote identical components in order to eliminate redundant description thereof.

In the present invention, a transform domain approach is provided for generating sync sequences with notched tones whose cross-correlation with the non-notched sequences is maintained as good as the auto-correlation of the notched sequences. Although the sync sequences have similar correlation properties, the approach of the present invention for constructing the desired sequence with DAA ability is elementary and simple. Basically, the present invention transforms the correlation requirements into frequency domain identities and can be used to generate a number of sequences with different tone notching requirements in OFDM systems.

Suppose $x(0), x(1), x(2), \ldots, x(N-1)$ is a time-domain sync sequence, its frequency domain response is $X(0), X(1), X(N-1)$, where $$X(k) = \frac{1}{\sqrt{N}} \sum_{n=0}^{N-1} x(n) \cdot e^{-\frac{j2\pi kn}{N}}, k = 0, 1, 2, \ldots, N-1$$

If the system requires a subset A of sub-carriers to be turned off, redesign of the sync sequence is not necessary, in a first preferred embodiment. In a first preferred embodiment, the present invention notches spectrum $X(k)$ to be zero in subset A and then obtains its time-domain version. Therefore, the resultant time-domain sequence is $$x'(n) = x(n) - \frac{1}{\sqrt{N}} \sum_{k \in A} X(k) \cdot e^{\frac{j2\pi kn}{N}}, k = 0, 1, 2, \ldots, N-1 \quad (1)$$

The transmitter uses $x'(n)$ as a new sync sequence, while the receiver doesn't need to know this information and still uses the original sync sequence $x(n)$ to correlate with the received signal.

This technique, of a first preferred embodiment, guarantees that a receiver finds a peak because in the frequency domain the energy captured by correlation is only reduced by a small amount in subset A of sub-carriers. On the other hand, this notching method can be viewed from the perspective that the channel gets deep-faded from sub-carrier subset A and as a result the original sync sequence still works for this kind of channel.

A symmetric notching is needed whenever the resultant sync sequence is required to be real. For certain transmission modes with frequency domain spreading (put one symbol on sub-carrier k and put its conjugate on sub-carrier N−k, except k=0), the time-domain signal is real for payload transmission. As is well known, the real part of the signal is passed into I-branch of the transmitter chain and the imaginary part of the signal is passed into the Q-branch of the transmitter chain. In this case, only the I-branch is needed to reduce the transmitter complexity in this low-rate mode. To be consistent with the transmission of data part, this symmetric notching method is needed in the sync sequence. It is well known that AGC (automatic gain control) is at the front end of a demodulator to eliminate chain gain variations, which could affect the amplitude detector. Therefore, the notching must be consistent from the aspect of AGC to the subsequent notching pattern in the channel estimation sequence and the payload part so that the amplitude of received signals for the sync sequence can be maintained at the same level as that of received signals for the notched channel estimation sequence and the notched payload part. In a second preferred embodiment, the mathematical formula for the new sync sequence for the transmitter is $$x''(n) = x(n) - \frac{1}{\sqrt{N}} \sum_{k \in A} 2\text{Re}\left\{X(k) \cdot e^{\frac{j2\pi kn}{N}}\right\}, k = 0, 1, 2, \ldots, N-1 \quad (2)$$

A sync sequence with good correlation properties is desired in many communication systems. Oftentimes, it is desirable to have a family of sequences whose autocorrelation function has a single peak at zero delay. Since the sync sequence with tone notching of the present invention is different from the sync sequence stored at the receiver, the cross-correlation function between them has been checked to determine that it has a single peak at zero delay.

Some simulation results are presented below for CM1 and CM2 channel models generally used in UWB systems. Synchronization is performed by running cross-correlation between the received signals for notched sync sequence x'(n), (x''(n) and original sequence x(n).

FIG. 1 illustrates the spectrum of the original sync sequence, which is fat to satisfy the emission mask.

Figure 2:
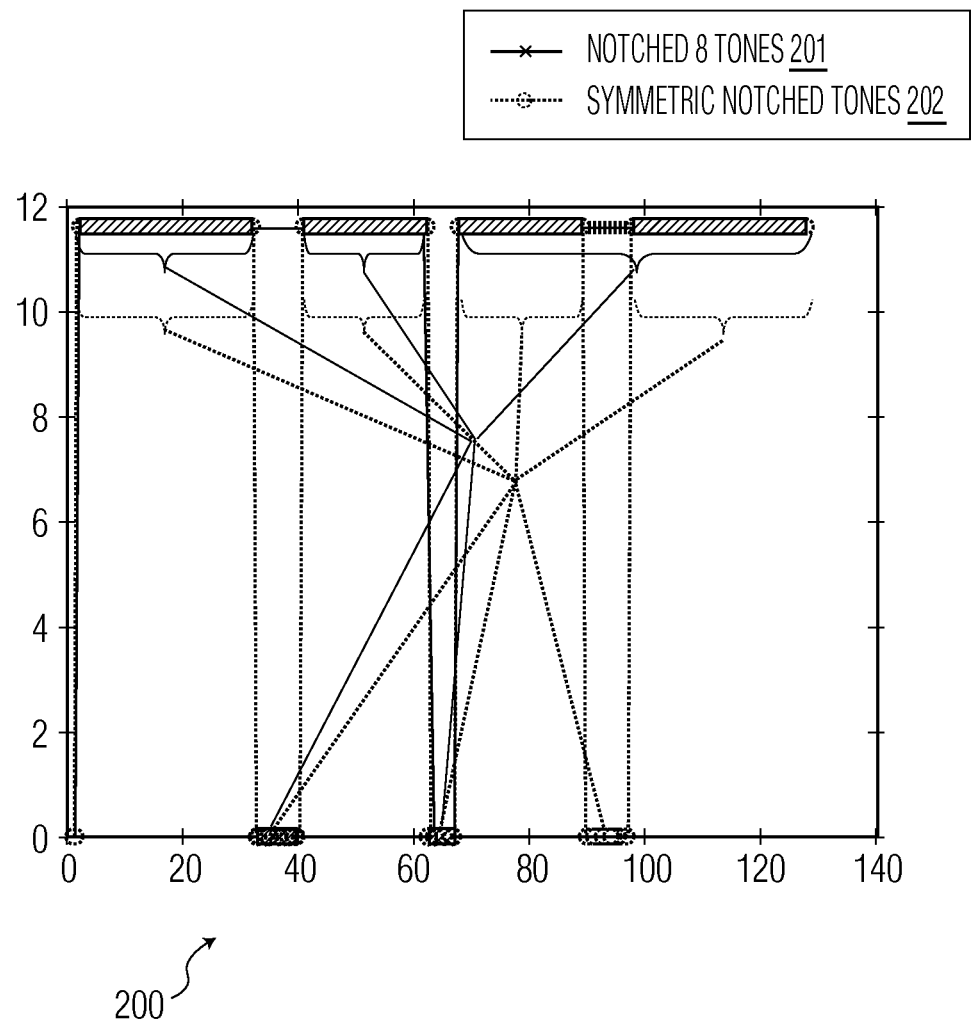
FIG. 2 illustrates the spectrum of FIG. 1 notched using one-sided notching and symmetric notching.

FIG. 2 illustrates that according to the present invention the spectrum of FIG. 1 is notched to zero from sub-carrier 32 to 39 for one-sided notch and is notched to zero from sub-carrier 89 to 96 for symmetric notching as well.

Figure 3:
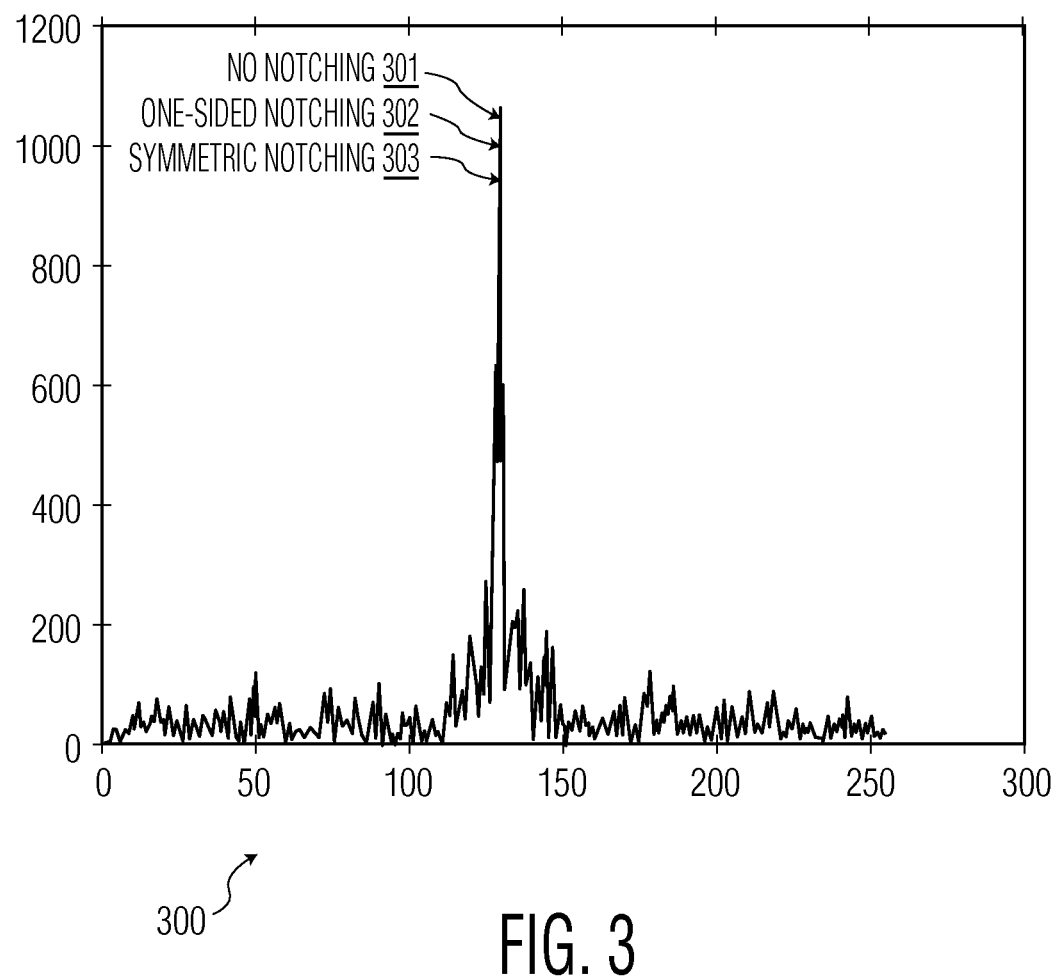
FIG. 3 illustrates the correlation results for synchronization at the receiver under CM1 channel.

FIG. 3 illustrates the correlation results for synchronization at the receiver under CM1 channel. The peak value for one-sided notching and symmetric notching, according to the first and second embodiments of the present invention, respectively are found as 1008.8 302 and 940.4 compared to 1041.8 303 for synchronization without notching 301.

Figure 4:
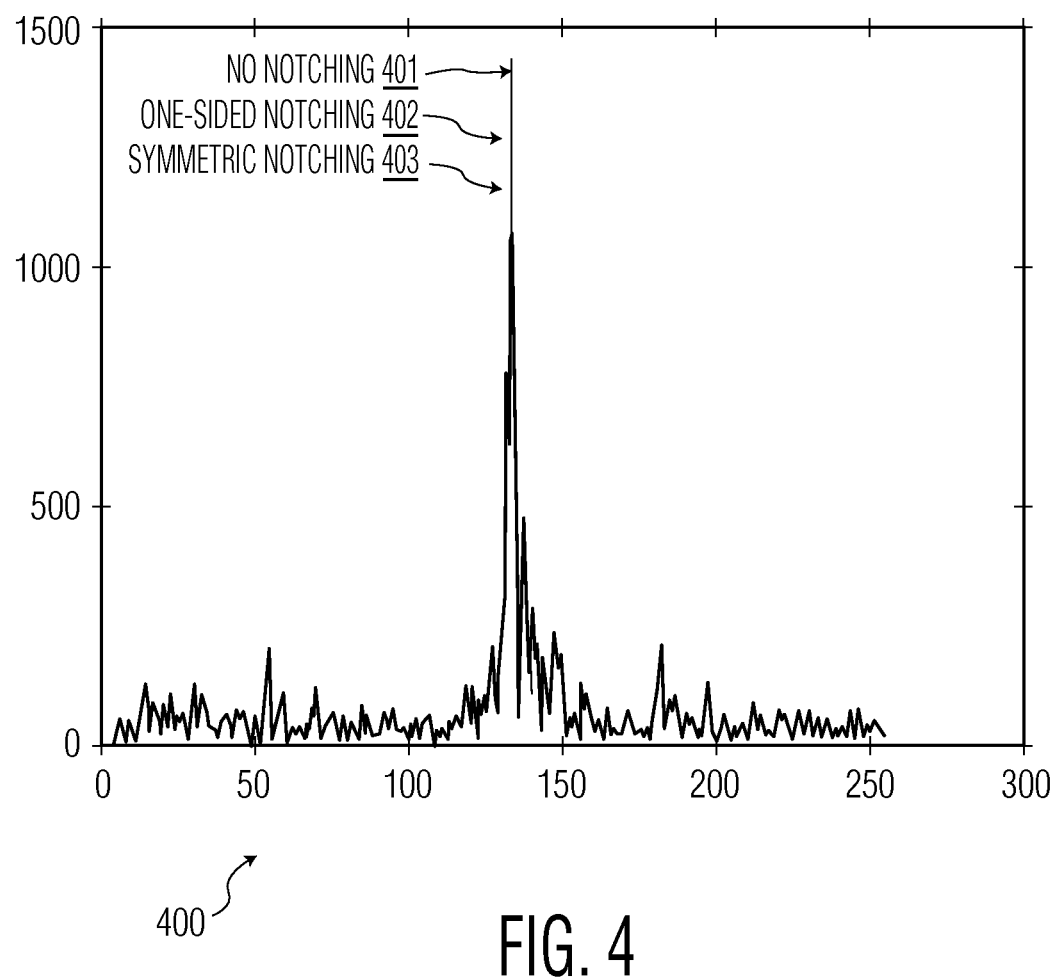
FIG. 4 illustrates the correlation results for synchronization at the receiver under CM2 channel.

FIG. 4 illustrates the correlation results for synchronization at the receiver under CM2 channel. The peak value for one-sided notching and symmetric notching, according to the first and second embodiment of the present invention, respectively are found as 1322.9 402 and 1228.9 403 compared to 1427.5 for synchronization without notching 401.

Figure 5:
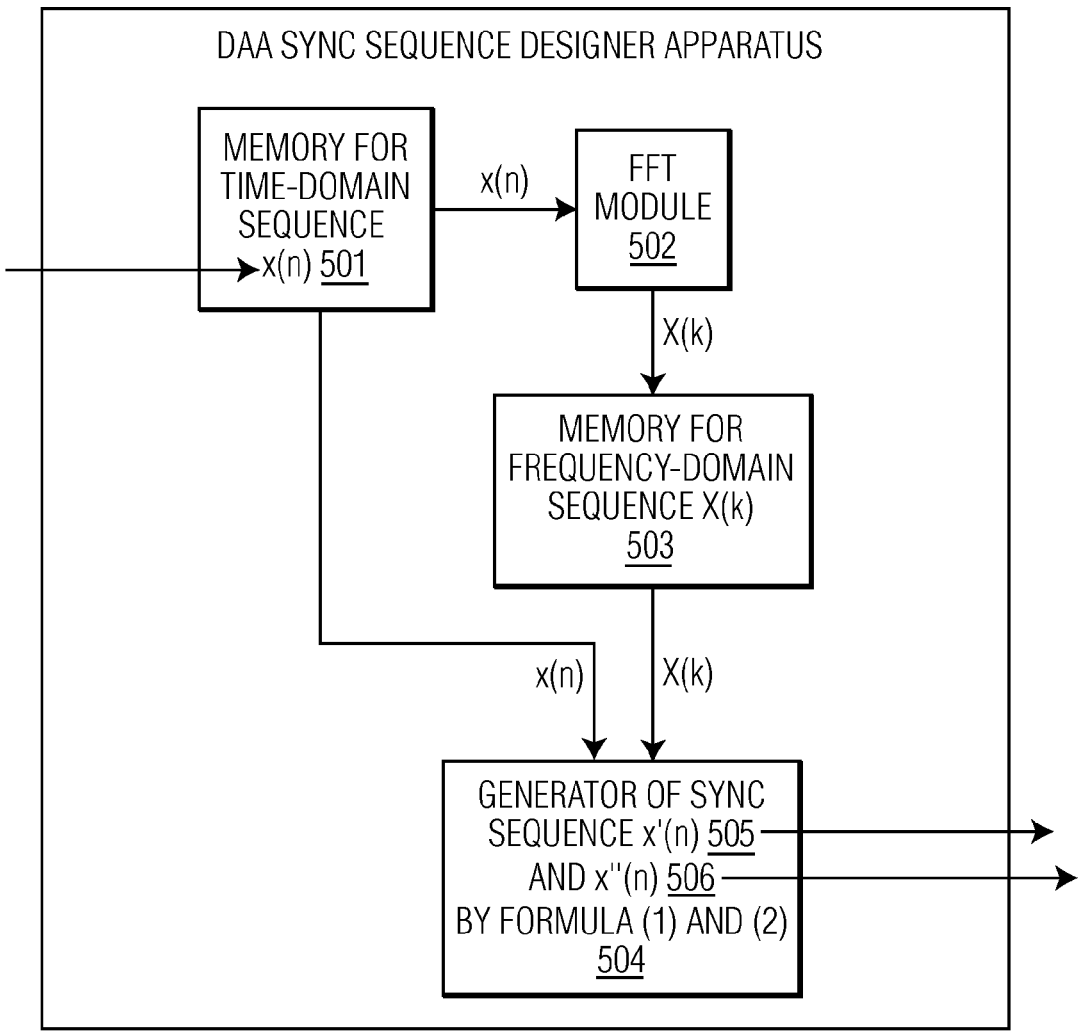
FIG. 5 illustrates an apparatus diagram for generating sync sequences with tone notching from the original sequence, according to the present invention.

FIG. 5 illustrates a sync generator apparatus 500 for generating sync sequences with tone notching from the original sync sequence, according to the first and second embodiments of the present invention. The sync generator apparatus 500 comprises a first memory 501 for storing the time-domain sequence x(N), an FFT module 502 operably connected to the first memory 501 for access to the time-domain sequence x(N) stored therein. The FFT module 502 outputs the frequency domain sequence X(k) and stores it in a second memory 503 to which it is also operably connected. A sync generator module 504 is operably connected to the first 501 and second 503 memory for respective access to the time-domain sequence x(N) and the frequency domain sequence X(k) respectively stored therein and generates therefrom sequences x'(n) 505 and x''(n) 506 as a new sync sequences using formulas (1) and (2) above. A transmitter (not shown) would then transmit the generated sequence whenever DAA is needed.

Figure 6:
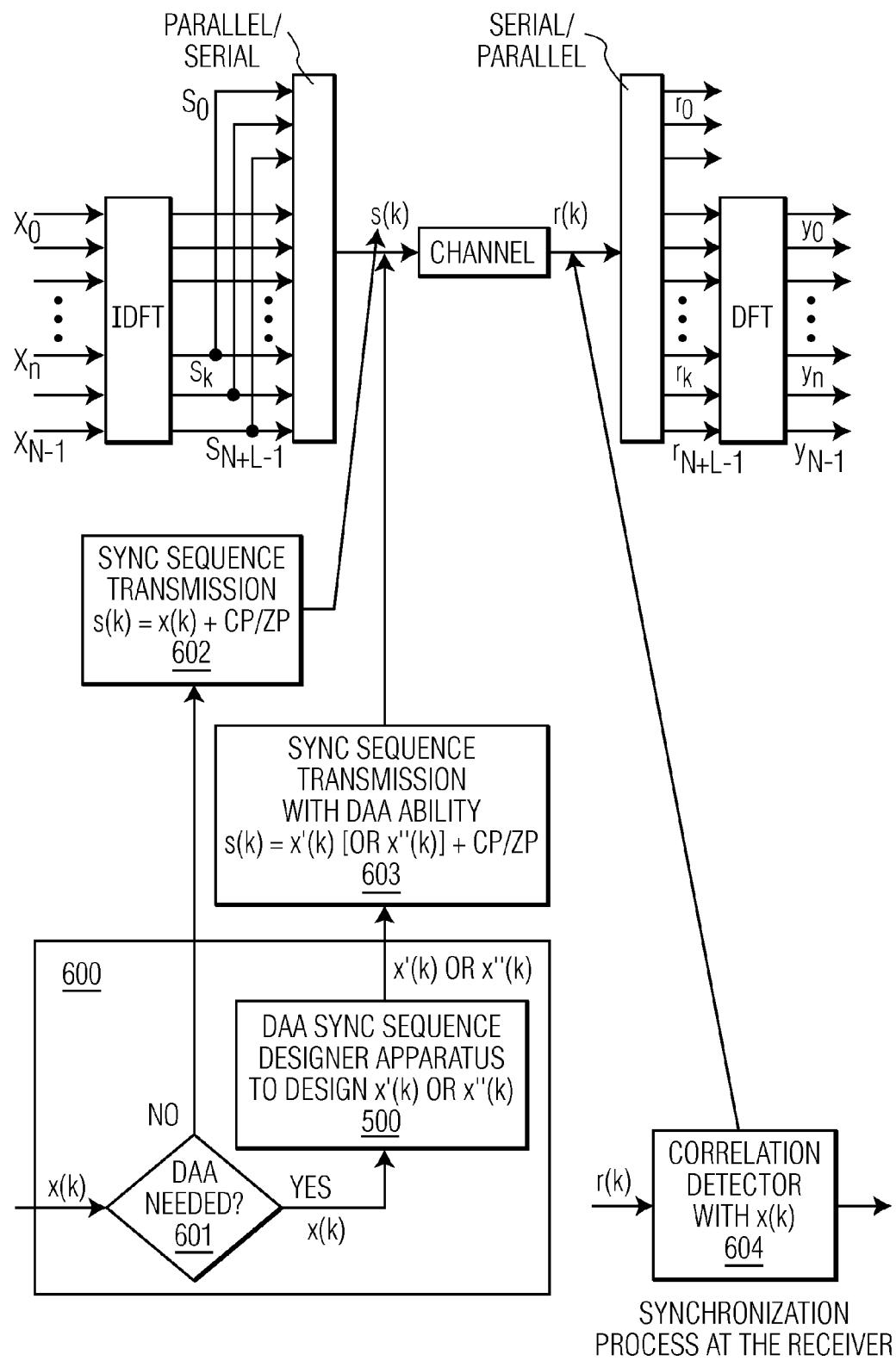
FIG. 6 illustrates an OFDM system to switch between DAA and non-DAA mode by using a generated sync sequence, according to the present invention.

FIG. 6 illustrates an OFDM system 600 switching between DAA and non-DAA modes by using a generated sync sequence, without any change to the receiver structure. At 601 it is determined at the transmitter whether or not DAA is needed. If not, no new sync sequence is generated and transmission takes place using the original sync sequence at 602. If DAA is needed then, in accordance with either a first or a second embodiment, at 603 a sync sequence is generated using formula (1) or (2) above and the generated sync sequence is transmitted. No change is required at the receiver at step 604.

It can be seen from the simulations graphically presented in FIGS. 3 and 4 that the peak is reduced by such a small amount such that replacing the original sync sequence with a generated sync sequence according to a first or a second embodiment does not affect the synchronization process at the receiver at all.

One of the immediate applications is the next generation Multi-Band OFDM UWB systems.

While, embodiments of the present invention have been illustrated and described, one skilled in the art will understand that changes may be made in these embodiments without departing from the principles and spirit of the present invention, the scope of which is defined in the appended claims and their equivalents.

We claim:

1. A system for design of a sync sequence, comprising:
a detect and avoid (DAA) detection module to receive an original time-domain sync sequence, determine whether DAA is needed, and output the determination and the original time-domain sync sequence; and
a DAA sync sequence designer apparatus operably connected to the DAA detection module to receive the original time-domain sync sequence, the DAA sync sequence designer apparatus comprising:
a first memory to store the original time-domain sync sequence;
a second memory to store a frequency-domain sync sequence derived from the original time-domain sync sequence;
an FFT module operably connected to the first memory to retrieve therefrom and fast Fourier transform the original time-domain sync sequence into the frequency-domain sync sequence, and operably connected to the second memory to store therein the frequency-domain sync sequence; and
a generator module operably connected to the first and second memory to design at least one of a one-sided and a symmetrically notched sync sequence from the original time-domain and frequency-domain sequence respectively stored tehrein, when the determination is that DAA is needed,
wherein a correlation property of the original time-domain sync sequence is maintained at a receiver when the at least one notched sync sequence is used by a transmitter of signals received by the receiver.

2. The system of claim 1, wherein:
the determination is a subset of sub-carriers to be turned off; and
the DAA sync sequence designer apparatus is further configured such that the at least one notched sync sequence is designed from the original time-domain sync sequence as a time-domain version of the original having spectrum notched to be zero in the subset.

3. The system of claim 2, wherein:
given x(0), x(1), x(2), . . . , x(N−1) is the original time-domain sync sequence, its frequency domain response is X(0), X(1), . . . , X(N−1), where $$X(k) = \frac{1}{\sqrt{N}} \sum_{n=0}^{N-1} x(n) \cdot e^{\frac{j2\pi kn}{N}}, k = 0, 1, 2, \ldots, N-1$$

the DAA sync sequence designer apparatus is further configured to notch spectrum X(k) to be zero on one side in the subset, such that the tone notching is one-sided, and then obtain its time-domain version such that the resultant time-domain version is $$x'(n) = x(n) - \frac{1}{\sqrt{N}} \sum_{k \in A} X(k) \cdot e^{\frac{j2\pi kn}{N}}, k = 0, 1, 2, \ldots, N-1.$$

4. The system of claim 2, wherein:

the resultant sync sequence is required to be real and the notching is symmetric;

given x(0), x(1), x(2), . . . , x(N−1) is the original time-domain sync sequence, its frequency domain response is X(0), X(1), . . . , X(N−1), where $$X(k) = \frac{1}{\sqrt{N}} \sum_{n=0}^{N-1} x(n) \cdot e^{\frac{j2\pi kn}{N}}, k = 0, 1, 2, \ldots, N-1$$

the DAA sync sequence designer apparatus is further configured to design the at least one symmetrically notched sync sequence x"(n) as $$x''(n) = x(n) - \frac{1}{\sqrt{N}} \sum_{k \in A} 2\mathrm{Re}\left\{X(k) \cdot e^{\frac{j2\pi kn}{N}}\right\}, k = 0, 1, 2, \ldots, N-1.$$

5. An apparatus for DAA sync sequence design, comprising:

a first memory to store a time-domain sync sequence;

a second memory to store a frequency-domain sync sequence derived from the time-domain sync sequence;

an FFT module operably connected to the first memory to retrieve therefrom and fast Fourier transform the time-domain sync sequence into a frequency-domain sync sequence, and operably connected to the second memory to store therein the frequency-domain sync sequence; and a generator module operably connected to said first and second memory to design at least one of a one-sided and a symmetrically notched sync sequence from said time-domain and frequency-domain sequence respectively stored therein.

6. The apparatus of claim 5, wherein when the notching is one sided, x(0), x(1), x(2), . . . , x(N−1) is the original time-domain sync sequence, and its frequency domain response is X(0), X(1), . . . , X(N−1), where $$X(k) = \frac{1}{\sqrt{N}} \sum_{n=0}^{N-1} x(n) \cdot e^{\frac{j2\pi kn}{N}}, k = 0, 1, 2, \ldots, N-1$$

the generator module is further configured to notch spectrum X(k) to be zero on one side in subset A and then obtain its time-domain version such that the resultant time-domain version is $$x'(n) = x(n) - \frac{1}{\sqrt{N}} \sum_{k \in A} X(k) \cdot e^{\frac{j2\pi kn}{N}}, k = 0, 1, 2, \ldots, N-1.$$

7. The apparatus of claim 6, wherein when the notching is symmetric, x(0), x(1), x(2), . . . , x(N−1) is the original time-domain sync sequence, and its frequency domain response is X(0), X(1), . . . , X(N−1), where $$X(k) = \frac{1}{\sqrt{N}} \sum_{n=0}^{N-1} x(n) \cdot e^{\frac{j2\pi kn}{N}}, k = 0, 1, 2, \ldots, N-1$$

the generator module is further configured to notch spectrum X(k) to be zero symmetrically in subset A and then obtain the real sequence as $$x''(n) = x(n) - \frac{1}{\sqrt{N}} \sum_{k \in A} 2\mathrm{Re}\left\{X(k) \cdot e^{\frac{j2\pi kn}{N}}\right\}, k = 0, 1, 2, \ldots, N-1.$$

8. The apparatus of claim 5, wherein when the notching is symmetric, x(0), x(1), x(2), . . . , x(N−1) is the original time-domain sync sequence, and its frequency domain response is X(0), X(1), . . . , X(N−1), where $$X(k) = \frac{1}{\sqrt{N}} \sum_{n=0}^{N-1} x(n) \cdot e^{\frac{j2\pi kn}{N}}, k = 0, 1, 2, \ldots, N-1$$

the generator module is further configured to notch spectrum X(k) to be zero symmetrically in subset A and then obtain the real sequence as $$x''(n) = x(n) - \frac{1}{\sqrt{N}} \sum_{k \in A} 2\mathrm{Re}\left\{X(k) \cdot e^{\frac{j2\pi kn}{N}}\right\}, k = 0, 1, 2, \ldots, N-1.$$

9. A method for designing a sync sequence, comprising:

receiving, by a detect and avoid (DAA) detection module, an original time-domain sync sequence;

determining whether DAA is needed;

outputting the determination and the original time-domain sync sequence;

receiving, by a DAA sync sequence designer apparatus operably connected to the DAA detection module, the original time-domain sync sequence, the DAA sync sequence designer apparatus comprising:

a first memory to store the original time-domain sync sequence;

a second memory to store a frequency-domain sync sequence derived from the original time-domain sync sequence;

an FFT module operably connected to the first memory to retrieve therefrom and fast Fourier transform the original time-domain sync sequence into the frequency-domain sync sequence, and operably connected to the second memory to store therein the frequency-domain sync sequence; and a generator module operably connected to the first and second memory to design at least one of the one-sided and a symmetrically notched sync sequence from the original time-domain and frequency-domain sequence respectively stored therein, when the determination is that DAA is needed, maintaining a correlation property of the original time-domain sync sequence at a receiver when the at least one notched sync sequence is used by a transmitter of signals received by the receiver.

10. The method of claim 9, wherein:

the determining further comprises specifying a subset of sub-carriers to be turned off; and the designing further comprising deriving the at least one notched sync sequence from the original time-domain sync sequence as a time-domain version of the original having spectrum notched to be zero in the subset.

11. The method of claim 10, further comprising:

when the tone-notching is one-sided, and given x(0), x(1), x(2), . . . , x(N−1) is the original time-domain sync sequence such that its frequency domain response is X(0), X(1), . . . , X(N−1), where $$X(k) = \frac{1}{\sqrt{N}} \sum_{n=0}^{N-1} x(n) \cdot e^{-\frac{j2\pi kn}{N}}, k = 0, 1, 2, \ldots, N-1$$

notching spectrum X(k) to be zero on one side in the subset; and then designing the time-domain version of the notched spectrum as the one-sided tone-notching given by $$x'(n) = x(n) - \frac{1}{\sqrt{N}} \sum_{k \in A} X(k) \cdot e^{\frac{j2\pi kn}{N}}, k = 0, 1, 2, \ldots, N-1.$$

12. The method of claim 11, further comprising:

when the tone-notching is symmetric, designing the at least one symmetrically tone-notched sync sequence x″(n) as $$x''(n) = x(n) - \frac{1}{\sqrt{N}} \sum_{k \in A} 2\text{Re}\left\{X(k) \cdot e^{\frac{j2\pi kn}{N}}\right\}, k = 0, 1, 2, \ldots, N-1.$$

* * * * *